N. Jenkins,
Globe Valve,
No. 82,844. Patented Oct. 6, 1868.

Witnesses:
Edward Griffith
Edmund N. Hewins

Inventor:
Nathaniel Jenkins.
by his Attorney.
Frederick Curtis.

United States Patent Office.

NATHANIEL JENKINS, OF BOSTON, MASSACHUSETTS.

*Letters Patent No. 82,844, dated October 6, 1868.*

---

IMPROVEMENT IN STEAM GLOBE-VALVES.

---

*The Schedule referred to in these Letters Patent and making part of the same.*

---

TO ALL TO WHOM THESE PRESENTS SHALL COME:

Be it known that I, NATHANIEL JENKINS, of Boston, county of Suffolk, and State of Massachusetts, have made a new and useful Improvement or Improvements in Steam or Water-Valves; and do hereby declare the following to be a full, clear, and exact description thereof, due reference being had to the accompanying drawings, making part of this specification, and in which—

The invention is of that class of globe-valves in which an elastic or semi-elastic packing is employed for sealing the joint of the valve; the object of this invention being to provide more perfect security or additional means of security against clandestine escape of the steam or water about the joint of the valve, when closed, the same construction which accomplishes this also producing a durable or lasting valve.

The invention consists in a peculiar construction or arrangement of parts, and the combination therewith of an elastic or semi-elastic annulus or packing; the arrangement of parts being such that, in the event of the destruction or weakening of the elastic packing, the metallic portions of the joint shall come in contact, and operate to effect a tight union of the same.

By referring to the accompanying drawings, before referred to as constituting part of this specification, it will be seen that A denotes a valve, of the ordinary construction of "globe-valves," in which $a$ is the chamber, and $b$ $c$ the inlet and outlet, and $d$ the stem; $e$, the stopper or valve, and $f$ the valve-seat, the latter being an annular ledge, raised some distance above the surrounding metal, $f'$.

The valve is composed of a metallic head, $g$, pivoted to the lower end of the stem $d$, in any suitable manner, such head being formed, upon its under side, with an annular chamber, for reception of an annulus or packing, $h$, of elastic or semi-elastic India rubber, or other suitable material or compound, the said packing being retained in place in its chamber by a nut, $i$, screwed upon the shank of the head, $g$, and partially overlapping it, the packing extending a short distance below or beyond the end or circumscribing circumference of the head, $g$.

The stuffing-box, surrounding the stem $d$, is shown at $j$.

The operation of the above-described valve is as follows:

Upon lowering the valve $e$, in the act of closing the valve-opening or passage $k$, the elastic or semi-elastic packing $h$ is pressed tightly upon the annular raised seat $f$, which, by such pressure, is forced somewhat into the packing, and a tight joint between the valve and seat secured.

From long usage, or from being subjected to the action of great heat, the packing $h$ may become enlarged or distended. Should this take place, it will, upon descent of the valve, become enclosed between the annular end, $l$, or face of the valve-head $g$, and the surface $f'$ immediately surrounding the valve-seat $f$, and by this means form a secondary or additional means of closing the opening $k$ against passage of steam or water.

Should the packing $h$, in extreme cases, become wholly or partially destroyed, and unfit to perform its functions, the two metallic surfaces, $l$ and $f'$, will be brought tightly in contact, and in themselves form a close joint, thus creating an additional and third means or resource for effecting the desired object.

Figure 1:
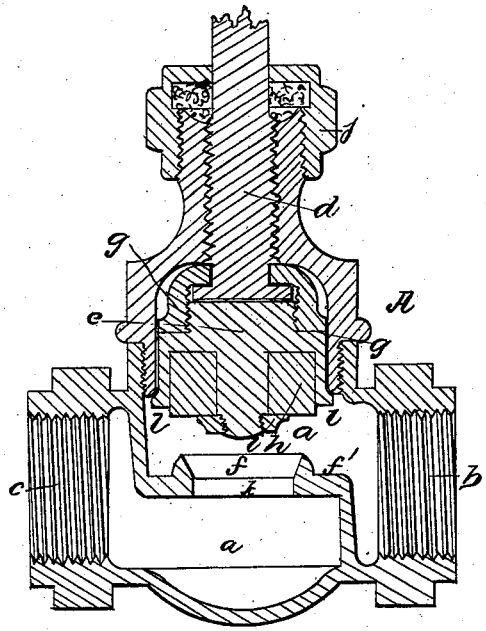
Figure 1 is a central longitudinal section of a globe-valve provided with my invention.
Figure 2:
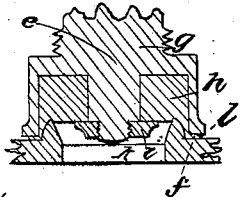
Figure 2 is a section of its stem and seat, showing a modified condition of its principles.
Figure 3:
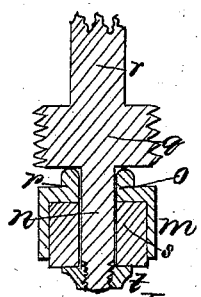
Figure 3 is a section of a modified construction of the valve-stem, to be hereinafter explained.

Fig. 3 of the accompanying drawings shows a mode of connecting or swivelling the valve-head to the stem, dissimilar to that shown in fig. 1 of such drawings, the latter construction being extremely simple and economical in its construction.

It consists simply in an inverted bell or cup, $m$, having a central hole, $o$, made through its top, for reception of the shank $n$ of the valve-stem $r$, such hole $o$ being surrounded by a projecting, narrow, convex bead or lip, $p$, which bears against the end of the elevating and depressing-screw $q$ of the valve-stem $r$, the packing $s$ being retained in place within the cup by a clamp-nut, $t$, screwed upon the extremity of the shank $n$, which passes through such packing.

The annular bead or lip allows of the necessary rotations of the shank $n$ within the cup and packing, without causing like rotation of such cup.

I claim as my invention, and desire to secure by Letters Patent of the United States—

The arrangement of the bearing-surface $l$ of the valve-head and the elastic packing, held in an annular recess in the valve-head, as described, with the valve-seat $f'$ and the raised seat $f$, in the manner as shown and specified.

NATH'L JENKINS.

Witnesses:
FRED. CURTIS,
EDWARD GRIFFITH.